United States Patent
Venkatasubramanian et al.

(10) Patent No.: US 10,820,309 B2
(45) Date of Patent: Oct. 27, 2020

(54) COMMUNICATIONS IN A WIRELESS SYSTEM

(71) Applicant: Nokia Solutions and Networks Oy, Espoo (FI)

(72) Inventors: Venkatkumar Venkatasubramanian, Wroclaw (PL); Ali Yaver, Wroclaw (PL); Matthias Hesse, Drebach (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 67 days.

(21) Appl. No.: 15/529,201

(22) PCT Filed: Dec. 2, 2014

(86) PCT No.: PCT/EP2014/076324
§ 371 (c)(1),
(2) Date: May 24, 2017

(87) PCT Pub. No.: WO2016/086981
PCT Pub. Date: Jun. 9, 2016

(65) Prior Publication Data
US 2017/0332355 A1   Nov. 16, 2017

(51) Int. Cl.
*H02J 3/16* (2006.01)
*H04W 72/04* (2009.01)
*H04W 92/18* (2009.01)

(52) U.S. Cl.
CPC .......... *H04W 72/042* (2013.01); *H04W 92/18* (2013.01)

(58) Field of Classification Search
CPC ..... H04W 4/70; H04W 72/0446; H04W 4/00; H04W 4/023; H04W 4/008; H04W 4/005; H04W 76/043; H04W 28/08; H04W 72/082; H04W 72/14; H04W 76/14; H04W 72/04; H04W 72/02; H04W 92/18; H04W 72/042
See application file for complete search history.

(56) References Cited

U.S. PATENT DOCUMENTS

| | | | |
|---|---|---|---|
| 9,319,192 B2 * | 4/2016 | Kim | H04L 5/0037 |
| 9,516,652 B2 * | 12/2016 | Fodor | H04W 76/14 |
| 9,629,125 B2 * | 4/2017 | Lu | H04W 72/04 |
| 9,699,589 B2 * | 7/2017 | Novak | H04W 4/70 |

(Continued)

FOREIGN PATENT DOCUMENTS

WO   2012/066433 A1   5/2012

OTHER PUBLICATIONS

International Search Report and Written Opinion received for corresponding Patent Cooperation Treaty Application No. PCT/EP20141076324, dated Aug. 14, 2015, 12 pages.

*Primary Examiner* — Hanh H Nguyen
(74) *Attorney, Agent, or Firm* — Squire Patton Boggs (US) LLP

(57) ABSTRACT

Methods and apparatus for controlling devices capable of device-to-device communication are disclosed. A network node determines at least two resource allocations for device-to-device communication between the devices. Information about the at least two resource allocations is then communicated to at least one of the devices for device-to-device communication. The device can then communicate with another device capable of device-to-device communication using one of the at least two resource allocations.

15 Claims, 6 Drawing Sheets

(56) References Cited

U.S. PATENT DOCUMENTS

| | | | |
|---|---|---|---|
| 9,706,550 B1* | 7/2017 | Zhou | H04W 72/0446 |
| 9,749,966 B2* | 8/2017 | Lindoff | H04W 52/383 |
| 2013/0229957 A1 | 9/2013 | Sartori et al. | |
| 2013/0258996 A1 | 10/2013 | Jung et al. | |
| 2014/0141789 A1 | 5/2014 | Tarokh et al. | |

* cited by examiner

FIG 6A

| # Device Type | Semi-persistent control | T1 | T2 | T3 | T4 | T5 | T6 (3 time-slots after T3) |
|---|---|---|---|---|---|---|---|
| | | DL | UL | UL | DL | UL | DL |
| AP1 | Control information from AP for DUE1 to DUE2 communication | Tx to DUE1 and DUE2. Scheduling grants Grant 1: RBs 1 to 20 Grant 2: RBs 5 to 10 Grant 3: RBs 6 to 20 Grant 4: RBs 1 to 15 | Indicates UE3 as uplink device. To be applied in T2 | Indicates both UE3 and DUE1 as uplink devices. This will be applied in T3 | Indicates UE3 as downlink device. | | | |
| DUE1 | | Tx with reuse to DUE2 using mode A | Tx with reuse to DUE2 using mode A | Tx D2D traffic to AP1 using mode B | Tx with reuse using mode A | Rx with reuse from DUE2 | |
| Semi-persistent scheduling grant | | Scheduling grant 1 | Scheduling grant 2 | Scheduling grant 3 | Scheduling grant 1 | | Scheduling grant 4 |

Decoding time

FIG 6B

| used for D2D | | | | | |
|---|---|---|---|---|---|
| Control information on each time slot (example) | UE3 allocated RB 1 to 20<br><br>DUE1 reuses RBs 1 to 20 in direct D2D using Grant 1 | UE3 allocated RBs 1 to 20<br><br>DUE1 reuses RBs 5 to 10 in direct D2D using Grant 2 | UE3 allocated RBs 1 to 5<br><br>DUE1 already allocated RBs 6 to 20 in Grant 3 | UE3 allocated RB 1 to 5<br><br>DUE1 reuses RBs 1 to 20 in direct D2D | DUE2 grant | UE3 allocated RB 16 to 20<br><br>DUE2 receives on RBs 1 to 15 |
| DUE2 | Rx from DUE1 | Rx from DUE1 | - | Rx from DUE1 | Tx with reuse to DUE1 | Rx from AP1 in mode B |
| UE3 | Rx from AP1 | Tx to AP1 | Tx to AP1 | Rx from AP1 | | - |

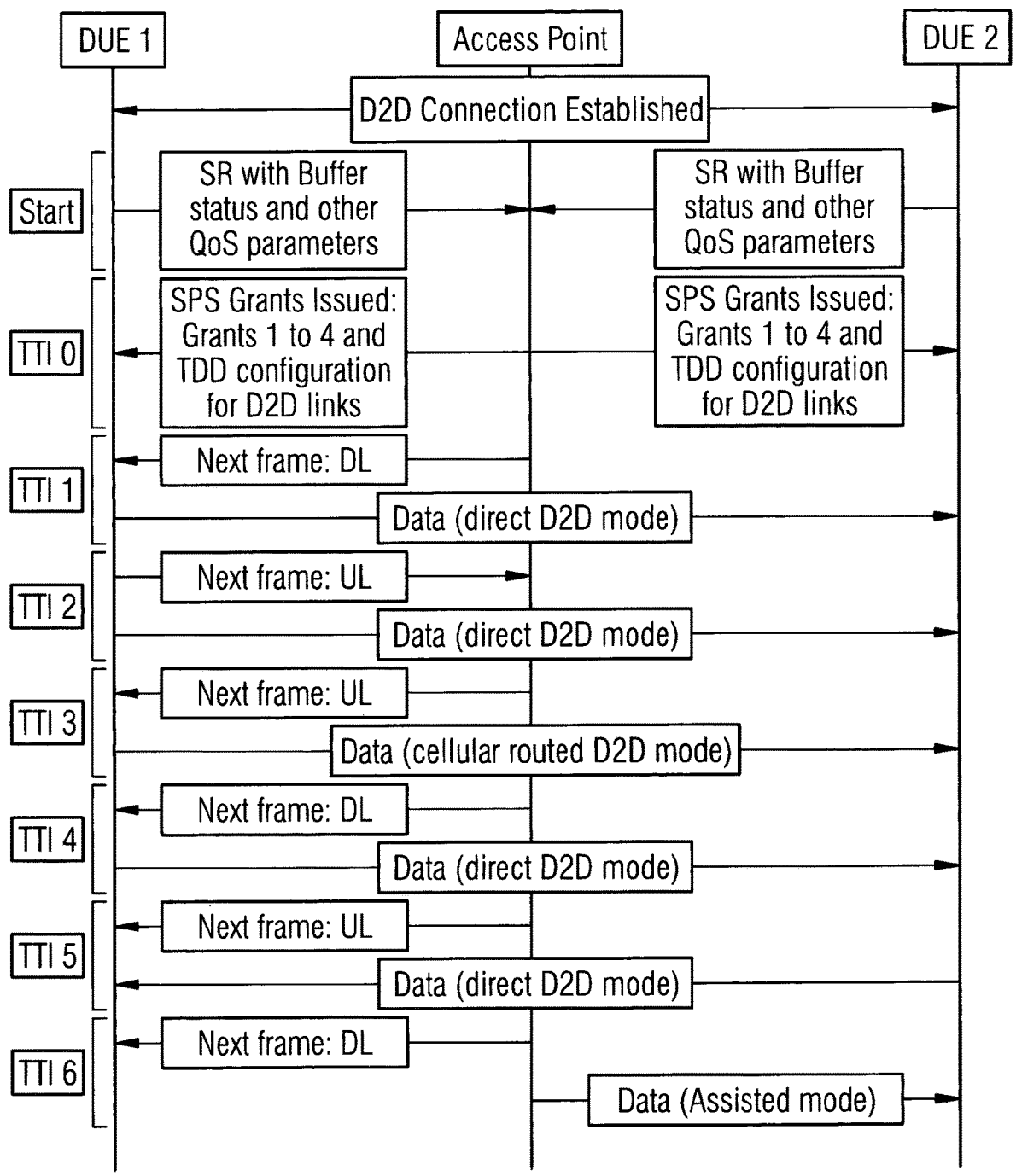

COMMUNICATIONS IN A WIRELESS SYSTEM

RELATED APPLICATION

This application was originally filed as Patent Cooperation Treaty Application No. PCT/EP2014/076324 filed Dec. 2, 2014.

This disclosure relates to communications in a wireless communication system and more particularly to systems enabling selective wireless device-to-device communication.

A communication system can be seen as a facility that enables communication between two or more nodes such as fixed or mobile communication devices, access points such as base stations, servers, machine-type devices and so on. A communication system and compatible communicating entities typically operate in accordance with a given standard or specification which sets out what the various entities associated with the system are permitted to do and how that should be achieved. For example, the standards, specifications and related protocols can define the manner how communications between communication devices and the access points shall be arranged, how various aspects of the communications shall be provided and how the equipment shall be configured.

Signals can be carried on wireless carriers. Examples of wireless systems include public land mobile networks (PLMN) such as cellular networks, satellite based communication systems and different wireless local networks, for example wireless local area networks (WLAN). Wireless systems can be divided into coverage areas referred to as cells, and hence the wireless systems are often referred to as cellular systems. A base station can provide one or more cells, there being various different types of base stations and cells. In modern radio communication networks, such as the Long Term Evolution (LTE) or the LTE-Advanced (LTE-A) of the 3rd Generation Partnership Project (3GPP), common base stations (often called as Node B; NB or enhanced Node B; eNB) are used.

A user can access the communication system and communicate with other users by means of an appropriate communication device or terminal. Communication apparatus of a user is often referred to as a user equipment (UE). Typically a communication device is used for enabling receiving and transmission of communications such as speech and data. A communication device is provided with an appropriate signal receiving and transmitting arrangement for enabling communications. A communication device, for example user equipment (UE) has conventionally communicated in a cellular system with another communication device via a network node such as a base station. Several base stations and other network nodes may be involved in communications between communication devices.

A communication device may be enabled to use so called proximity services. In accordance with an example of such services a device is enabled to communicate directly with another communication device. Such operation is often referred to as device-to-device (D2D) communications. D2D communications can be based on resources dedicated by a communication network for device-to-device (D2D) communications. D2D communications may be used to improve efficiency of a radio access network by offloading at least some of the traffic conventionally processed in the base station(s). Reduction in communication latency may also be provided because routing of the traffic through network node(s) such an access point/eNB may not be needed all the time. Resources may also be reused by D2D communication, i.e. the same resources (e.g. time, frequency and so on) can be used for D2D communication as is used in the cellular communication. Possibility to reuse resources can provide improvement in efficiency as the D2D communications can take place alongside cellular communications. Reuse is possible e.g. when the devices are in proximity as in such circumstances the devices do not generate "too much" if any interference to cellular users. The impact of interference can be further minimised through power control of D2D communications.

D2D capable devices willing to establish D2D communications may trigger a so-called D2D discovery process to set up the direct communications. In D2D discovery a device may e.g. advertise its capabilities and/or search for other devices capable of D2D communications. Features of device to device (D2D) discovery and radio layer design thereof are described in greater detail for example in relevant 3GPP Release 12 documents considering network controlled device to device (D2D) communications. Other devices in the area may use similar or different resources than the device willing to establish D2D communications. For example, the devices may be attached to the same cell or different cells and/or the same or different public land mobile network (PLMN), use the same or different frequencies and so on. Determination of available resources for the discovery and/or the direct communications can however be problematic.

Also, direct D2D communication may not always provide an optimal link between two D2D capable devices, in particular in terms of spectral efficiency. This sub-optimality may occur e.g. when the D2D transmitter and receiver determine that there are better channel conditions to the nearby access point than there is between the devices. To address this possibility, mode selection based on a switching mechanism between direct D2D and network-routed D2D may be provided. In mode selection D2D traffic can be selectively routed through the cellular networks in some time instances instead of a direct D2D transmission. In current proposals for semi-persistent scheduling for D2D the network performs semi-static D2D allocation and indicates the allocation via control signalling to D2D-capable devices. A semi-static allocation is made for a D2D-capable device assuming a reference radio bearer in cellular access mode between D2D devices. It is then assumed that the D2D capable devices can later on derive a semi-static allocation from the original semi-static allocation if they switch to direct D2D transmission.

The network however does not take the possible short term mode selection for D2D communications anyhow into account when allocating the resource. This can limit the D2D scheduling and resource allocation decision to be done per every time slot along with the mode selection. This in turn needs to be conveyed to the relevant user equipment. This can cause considerable overhead on the downlink control channels.

Therefore a possibility to provide information from the network for semi-persistent scheduling (SPS) for D2D communications while at the same time allowing mode selection to improve efficiency of D2D communication without causing excessive signalling overhead would be desired.

It is noted that the above discussed issues are not limited to any particular communication environment and station apparatus but may occur in any appropriate system where network controlled device to device communication is possible.

SUMMARY

Embodiments of the invention aim to address one or several of the above issues.

In accordance with an embodiment there is provided a method for controlling, by a network node, devices capable of device-to-device communication, comprising determining at the network node at least two resource allocations for device-to-device communication between the devices, and communicating information about the at least two resource allocations to at least one of the devices for device-to-device communication.

In accordance with an embodiment there is provided a method for a device capable of device-to-device communication, comprising receiving at the device from a network node information about at least two resource allocations for device-to-device communication, and communicating with another device capable of device-to-device communication using one of the at least two resource allocations.

In accordance with an embodiment there is provided an apparatus for a network node for controlling devices capable of device-to-device communication, the apparatus comprising at least one processor, and at least one memory including computer program code, wherein the at least one memory and the computer program code are configured, with the at least one processor, to cause the network node to determine at least two resource allocations for device-to-device communication between the devices, and to communicate information about the at least two resource allocations to at least one of the devices for device-to-device communication.

In accordance with an embodiment there is provided an apparatus for a communication device capable of device-to-device communication, the apparatus comprising at least one processor, and at least one memory including computer program code, wherein the at least one memory and the computer program code are configured, with the at least one processor, to cause the apparatus to receive from a network node information about at least two resource allocations for device-to-device communication, and to communicate with another device capable of device-to-device communication using one of the at least two resource allocations.

In accordance with a more specific aspect the at least two resource allocations comprise allocations of semi-static resources.

Information associated with the resource allocations can be communicated via high layer signalling or a physical layer downlink control channel.

The at least two resource allocations may comprise at least one resource allocation for direct communication between the devices and/or at least one resource allocation for communication between the devices via the network. The at least two resource allocations may comprise at least one uplink resource allocation and at least one downlink resource allocation.

Control on the device-to-device communication with the other device may be provided in accordance with control information communicated from the network. At least one scheduling rule may take into account semi-statically allocated resources. Coordination between at least two network nodes may be provided. Communication of control information to the device(s) may dynamic and/or per a communication time interval.

Selected resource allocation may be a resource allocation for direct communication between the devices in the absence of an indication to use the resource allocation for communication between the devices via the network. A resource allocation for communication via the network when control information indicates that the device is to communicate via the network may be selected.

A possibility is to select resource allocation for direct communication between devices capable of device-to-device communications when control information indicates that a relevant further device is scheduled to communicate via the network uplink or downlink resource in dependence on control information indicating whether a communication time interval is uplink or downlink. When a resource allocation for communication between the devices capable of device-to-device communication via the network is selected by at least one of the devices, use of different resources by the at least one device and a relevant further device within the resource allocation may be provided in response to an indication that the further device is also to communicate via the network. The further device may comprise a cellular device using at least in part the same resources as the devices capable of device-to-device communication.

One of a semi-persistent cellular radio network temporary identifier, a semi-persistent device-to-device radio network temporary identifier, a cellular radio network temporary identifier and a device-to-device radio network temporary identifier may be used for signalling information regarding a selected resource allocation and/or selected route.

A computer program comprising program code means adapted to perform the herein described methods may also be provided. In accordance with further embodiments apparatus and/or computer program product that can be embodied on a computer readable medium for providing at least one of the above methods is provided.

A communications device adapted for the operation can also be provided. A network node such as a base station, a controller for an access system or a controller for core network may be configured to operate in accordance with at least some of the embodiments. A communication system embodying the apparatus and principles of the invention may also be provided.

It should be appreciated that any feature of any aspect may be combined with any other feature of any other aspect.

Embodiments will now be described in further detail, by way of example only, with reference to the following examples and accompanying drawings, in which:

FIGS. 6 and 7 illustrate an example of semi-persistent transmission with fast mode selection.

DETAILED DESCRIPTION

In the following certain exemplifying embodiments with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

A non-limiting example of communication system architectures is the long-term evolution (LTE) of the Universal Mobile Telecommunications System (UMTS) that is being standardized by the 3rd Generation Partnership Project (3GPP). The LTE employs a mobile architecture known as the Evolved Universal Terrestrial Radio Access Network (E-UTRAN). Access point are provided by base stations which in such systems are known as evolved or enhanced Node Bs (eNodeBs; eNBs) and may provide E-UTRAN features such as user plane Radio Link Control/Medium Access Control/Physical layer protocol (RLC/MAC/PHY) and control plane Radio Resource Control (RRC) protocol terminations towards communication devices. Other examples of radio access system include those provided by base stations of systems that are based on technologies such as wireless local area network (WLAN) and/or WiMax (Worldwide Interoperability for Microwave Access).

Figure 1:
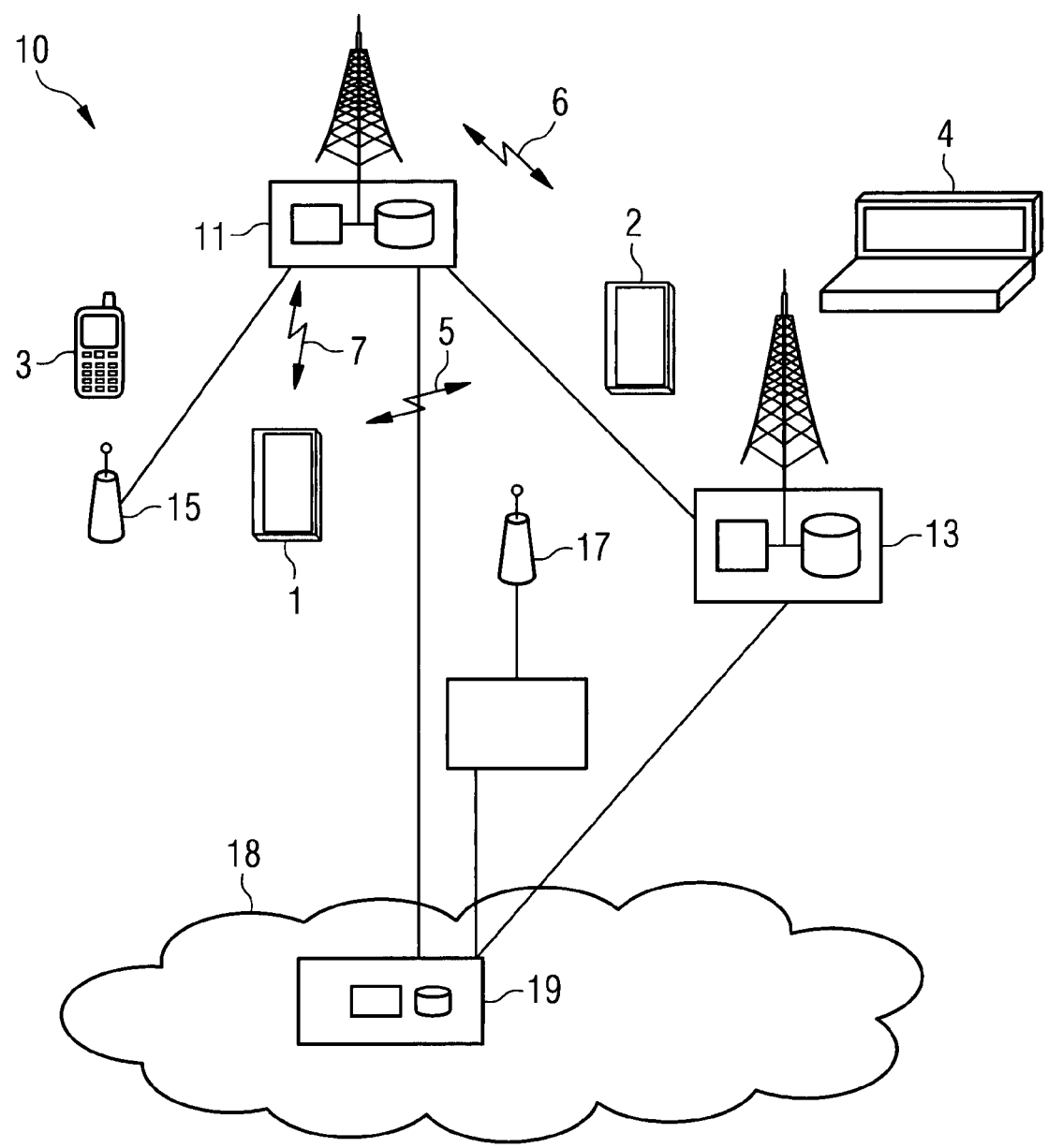
FIG. 1 shows a schematic diagram of a cellular system where certain embodiments can be implemented.

A number of communication devices 1 to 4 are shown. Communication devices or terminals 1 to 4 can be provided wireless access via base stations or similar wireless transmitter and/or receiver nodes providing radio service areas or cells of a radio access system. FIG. 1 shows four base stations 11, 13, 15 and 17 but it is noted that these are shown only for illustration purposes and that a larger or smaller number of base stations may be provided in a network. A base station can provide one or more cells or sectors. Access networks of a radio access system are typically although not necessarily connected to a core network denoted by numeral 18.

In FIG. 1 communications devices 1 and 2 are shown to communicate via respective wireless carriers 7 and 6 with the base station 11. Thus communications between devices 1 and 2 can be routed via the base station 11. The communication devices can also have a direct wireless communication link 5 there between.

Figure 2:
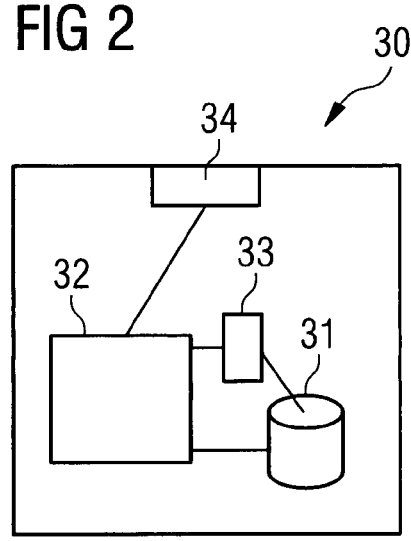
FIG. 2 shows a schematic diagram of a control apparatus according to some embodiments.

Base stations and hence communications in cells are typically controlled by at least one appropriate controller apparatus so as to enable operation thereof and management of mobile communication devices in communication with the base stations. FIG. 2 shows an example of a control apparatus for a node, for example to be integrated with, coupled to and/or otherwise for controlling any of the base stations. The control apparatus 30 can be arranged to provide control on communications in the service area of a base station site. The control apparatus 30 can be configured to provide control functions in association with allocation of scheduled transmissions. The control apparatus can also be configured for operation in association with device to device (D2D) communications even if the actual communications do not go via the relevant base station(s). For this purpose the control apparatus comprises at least one memory 31, at least one data processing unit 32, 33 and an input/output interface 34. Via the interface the control apparatus can be coupled to at least one receiver and at least one transmitter of the base station. The control apparatus can be configured to execute an appropriate software code to provide the control functions. It shall be appreciated that similar components can be provided in a control apparatus provided elsewhere in the network system, for example in core network entity 19 of FIG. 1. The control apparatus can be interconnected with other control entities. The control apparatus and functions may be distributed between several control units. In some embodiments, each base station can comprise a control apparatus. In alternative embodiments, two or more base stations may share a control apparatus. For example, in LTE a given eNB can control several cells.

Different types of cells include those known as macro cells, pico cells and femto cells. For example, transmission/reception points or base stations can comprise wide area network nodes such as a macro eNode B (eNB) which may, for example, provide coverage for an entire cell or similar radio service area. Base station can also be provided by small or local radio service area network nodes, for example Home eNBs (HeNB), pico eNodeBs (pico-eNB), or femto nodes. Some applications utilise radio remote heads (RRH) that are connected to for example an eNB.

Base stations and associated controllers may communicate with each other via fixed line connection and/or air interface. The logical connection between the base station nodes can be provided for example by an X2 interface. This interface can be used for example for coordination of operation of the base stations.

The communication devices 1 to 4 may comprise any suitable device capable of at least receiving wireless communication of data. For example, the terminals can be handheld data processing devices equipped with radio receiver, data processing and user interface apparatus. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, ear pieces with wireless connectivity, jewellery and so on, universal serial bus (USB) sticks with wireless capabilities, modem data cards, machine type devices or any combinations of these or the like.

Figure 3:
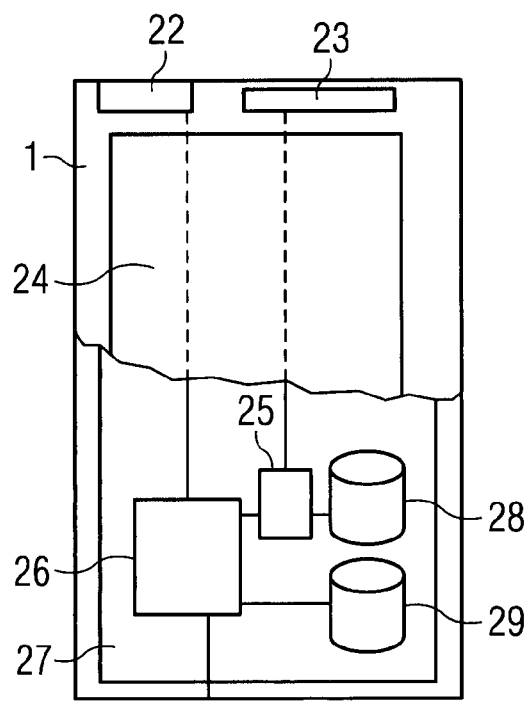
FIG. 3 shows a schematic presentation of a possible communication device.

FIG. 3 shows a schematic, partially sectioned view of a possible communication device. More particularly, a handheld or otherwise mobile communication device 1 is shown. A mobile communication device is provided with wireless communication capabilities and appropriate electronic control apparatus for enabling operation thereof in accordance with the herein described principles. Thus the mobile device 1 is shown being provided with at least one data processing entity 26, for example a central processing unit and/or a core processor, at least one memory 28 and other possible components such as additional processors 25 and memories 29 for use in software and hardware aided execution of tasks it is designed to perform. The data processing, storage and other relevant control apparatus can be provided on an appropriate circuit board 27 and/or in chipsets. Data processing and memory functions provided by the control apparatus of the mobile device are configured to cause control and signalling operations in accordance with certain embodiments of the present invention as described later in this description. A user may control the operation of the mobile device by means of a suitable user interface such as touch sensitive display screen or pad 24 and/or a key pad, one of more actuator buttons 22, voice commands, combinations of these or the like. A speaker and a microphone are also typically provided. Furthermore, a mobile communication device may comprise appropriate connectors (either wired or wireless) to other devices and/or for connecting external accessories, for example hands-free equipment, thereto.

The mobile device may communicate wirelessly via appropriate apparatus for receiving and transmitting signals. FIG. 3 shows schematically a radio block 23 connected to the control apparatus of the device. The radio block can comprise a radio part and associated antenna arrangement. The antenna arrangement may be arranged internally or externally to the mobile device. The device can be adapted for device-to-device (D2D) communications and for communications with a cellular system. D2D communication and the cellular communications can take place via the same or separate radio and antenna arrangement. Devices capable of direct communications are referred to in the following as D2D devices.

According to the herein disclosed principles a network element can define and transmit multiple semi-persistent grants to D2D devices. The scheduling information can be generated and transmission thereof to relevant devices caused by an appropriate control node of an access system, for example an access system controller. The multiple grants can be transmitted ahead of time rather than on transmit time interval (TTI). The scheduling can be predictive, e.g. made based on prediction of future resource usage in a relevant environment. This enables the D2D devices to select an optimal grant from the plurality of grants in its memory for a particular time slot based on monitoring the scheduling decisions of the network.

In accordance with a possible semi-persistent scheduling scheme information can be sent from the network to the D2D communication devices in the form of a bitmap of matrix of physical resource blocks. Possible excessive overhead can be avoided because of the time domain extension where the network node performs semi-static resource allocation for D2D devices by apriori factoring in future network traffic conditions and resource requirement of cellular users.

In accordance with an aspect semi-persistent resource allocation decisions in the network by an appropriate network node take into account the best possible or optimal mode selections of D2D devices. Sending of multiple grants beforehand that are then available for selection by the D2D device enables keeping the control signalling overhead on a relatively low level while enabling fast selection of the optimal mode. The scheduling decision information can include sufficient information for the mode selection possibilities.

Figure 4:
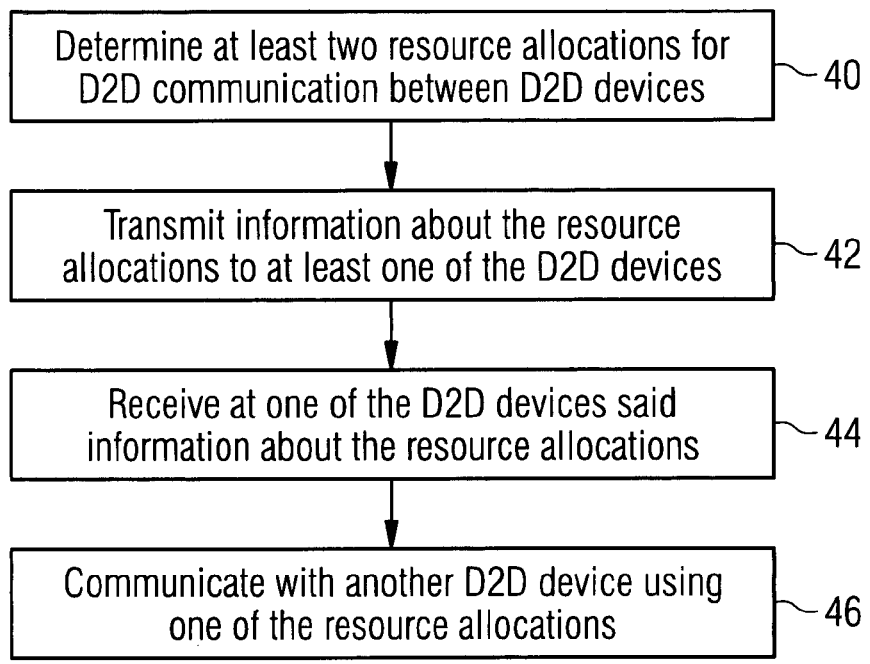
FIG. 4 is a flowchart according to an example.

An example of operation in accordance with an embodiment is illustrated by the flowchart of FIG. 4. In the method for controlling devices capable of device-to-device (D2D) communication a network node can determine at 40 at least two resource allocations for device-to-device communication between the devices. Information about the at least two resource allocations is then transmitted at 42 to at least one of the devices for D2D communication.

Steps 44 and 46 relate to operation at a device capable of device-to-device (D2D) communication. The device can receive at 44 information about at least two resource allocations for D2D communication. The device can thereafter communicate at 46 with another device capable of device-to-device (D2D) communication using one of the at least two resource allocations.

The resource allocations may comprise allocations of semi-static resources. Both devices can receive the resource allocation information from the network. Information associated with the resource allocations may be communicated from the network to at least one of the devices for device-to-device communications via high layer signalling. A possibility is to communicate via a physical layer downlink control channel. Examples of how the network can communicate control information relating to a selected resource allocation are given later.

A network element can allocate the grants and perform scheduling decisions in those grants based on different factors. For example, features such as channel quality, interference conditions and buffer status of D2D devices can be taken into account. Other factors having influence on usage the SPS grants may also be taken into account.

A predefined a set of rules for semi persistent scheduling (SPS) grants can be determined based on consideration of different criteria and evaluations. For example, rules can be determined for SPS duration, time division duplex (TDD) time configuration between devices link direction (Device 1→Device 2/Device 2→Device 1 transmit pattern), for taking into account the buffer status of both D2D devices, fixed SPS exit criteria based on e.g. link quality or link quality degradation of the D2D communication, and so on.

Information on the rules can be transmitted to the devices. This may take place e.g. via physical layer (PHY) scheduling grant. The rules may also be preconfigured by higher layer communications.

A protocol can be defined such that D2D devices continue listening to DL control frames after SPS grant allocation in order to appropriately apply the grant rules, for example rules in relation to multiple semi-persistent grants. A reason for this is that in flexible UUDL frame structure it may not be decided as to which frames would be UL and which would be DL at the time of SPS grant allocation and the D2D devices need to monitor the scheduling decisions by the network.

According to a possibility a mechanism and signalling scheme is provided where D2D devices can request SPS grants by sending a special request message. A D2D device can also request a change in SPS grants through UL control frames. An example of use scenario for this is when devices are using direct D2D mode and the network conditions get better. For example, devices may be getting closer to each other at a time that is different from the time of SPS allocation. Under these conditions, the D2D devices may determine a different change in SPS resources than originally anticipated and thus request the network to reclaim the remaining grants.

The network can thus provide multiple resource grants to D2D devices. The resource grants are received and stored, and can then be selectively applied by the D2D devices. The grants can be determined based on various information, e.g. based on channel equality feedback and buffer status reports. The grants can span several TTIs (or frames) based on SPS requirements.

According to an example multiple grants can correspond to following scenarios.

Grant 1: For D2D on downlink (DL) slots, contains transmission parameters and resource scheduling decisions to be used on downlink slots.

Grant 2: For D2D reuse on uplink (UL) slots, contains transmission parameters and resource scheduling decisions to be used on uplink slots.

Grant 3: Resource grant and scheduling decisions when D2D devices use the cellular mode transmission on uplink slots.

Grant 4: Resource grant and scheduling decisions which will be used for D2D cellular mode on downlink slots.

The grants can be indexed, for example indexed as 1 to 4. A more specific example of use of grants 1 to 4 above is explained later with reference to FIGS. 5, 6 and 7.

An escape mechanism can be defined such that the AP has the ability to change the grant rules if the basis that led to definition of the rules changes. AP can also cancel or extend the grants based on appropriate criteria. For example, including but not limited to buffer status, cell load etc. Rule change information can also be transmitted in the control frames that a D2D device is listening to. The rule change information may include D2D device identifier (ID) for addressing.

The network may perform fast switching between uplink and downlink on physical frames for cellular users. This can somewhat complicate D2D mode selection and resource scheduling for semi-persistent D2D resource scheduling. In accordance with a possibility semi-persistent D2D scheduling can be performed such that fast D2 mode switching is enabled on a time slot basis. An access point (AP) can allocate semi-persistent scheduling (SPS) grants such that a grant defines a resource to be used both in time and in frequency to D2D users. This can be particularly advantageous in case the D2D traffic is routed through base station in short time intervals. This kind of operation reduces the need for scheduling requests, e.g. need for scheduling grant cycle for every TTI.

Where multiple cells are available it is possible that two D2D devices of a D2D communication pair are located in different cells. For example, there can be two different neighbouring small cells (a transmitting and a receiving cell). In such case a prior coordination can be performed between the small cells for allocation of the SPS grants. Coordinated UL/DL decisions are performed by the cells on a time slot basis. A network element, for example an access point, can make a UL/DL decision and perform fast mode selection by choosing the appropriate SPS scheduling grant from available the SPS grants in each time slot for its D2D users after becoming aware of neighbour receiving cell decisions. The coordinated UL/DL between multiple cells can be realized through centralized or distributed scheduling. For more robust interference management in multi-cell cases, optionally an AP can extend the SPS grants to SPS grants 1 . . . 8 and signal the appropriate grant number explicitly in the control information in a time slot after taking into account the neighbour cell decisions. Grants 1 . . . 8 can be understood as mirror grants of grants 1 . . . 4 above. Grants 1 . . . 4 can be defined with reference to UL/DL decisions of the transmitting cell and grants 5 . . . 8 can be defined with reference to UL/DL decisions of the receiving cell. The mirror grants may be issued by the receiving cell or by a centralized entity. In every slot the UL/DL decision of the receiving cell can be communicated to the transmitting cell and an appropriate grant chosen from grants 1 . . . 8.

An uplink control frame and a downlink control frame can be sent in time slot ahead of the data part.

A benefit can be achieved in reduction of signalling overhead from the access point such as a base station as resending of resource map per each transmission slot can be avoided. Use of uplink grant request each time for cellular relayed D2D communication may also be avoided.

In accordance with an example D2D devices can send a scheduling request along with their buffer status reports. In case of two way traffic between D2D devices a relevant network element (e.g. an AP/eNB) determines a semi-static TDD time split between the D2D devices to be applied for the duration of semi-static scheduling. The devices are provided D2D Radio Network Temporary Identifiers (RNTI). These devices can also carry cellular Radio Network Temporary Identifiers (RNTI). Thus, two RNTIs can co-exist and at initiation of semi-static scheduling the devices may carry both a semi-persistent D2D RNTI and semi-persistent cellular RNTI. Other initialisation information may comprise information such as the set of resource blocks for which the semi-persistent mechanism will be applied, and the carrier information.

At the moment particular focus of the D2D development is on public safety use cases but broader use scenarios are also under consideration. The Broader D2D use cases are being considered e.g. in fifth generation (5G) research programs, and therefore 5G proposal based on orthogonal frequency division multiplexing (OFDM) in time division duplexing (TDD) is discussed below as an illustrative example. The 5G OFDM proposal is considered particularly for ultra-dense deployment of nodes in indoor scenarios. In this framework, the network controller is assumed to flexibly allocate a time slot to either only uplink users or downlink users based on the instantaneous traffic demand. In accordance with the current proposals 5G with dynamic UL/DL can provide relatively small cell sizes and D2D communication may provide comparable range with cell size. The chance that D2D devices are in different cells can become high and therefore such SPS schemes may particularly benefit from multi-cell coordination. In this case base station (AP/eNB) scheduling decision may also be replaced by a network level scheduling decision which is then transmitted by the AP to the device(s). Coordination can be provided by a centralized entity, e.g. a local centralized element or a macro base station. Coordination may also be realized through signalling between two small cells. Resource pool definitions can remain the same even for multi-cell D2D cases such that resource pools are always defined with reference to a D2D transmitter device and its associated cell. The frame structure in the proposed 5G concept has made certain assumptions which can have an impact on D2D operation. The OFDM transmit time interval (TTI/frame) length is shortened to 0.25 ms and the cellular resources can be scheduled in the shortened TTI (or frame). The corresponding OFDM signal bandwidth is increased to 200 MHz by using 2048 subcarriers. A TTI can be flexibly used as uplink or downlink implying that uplink downlink TDD split is not predetermined and the access point (AP) can make this decision dynamically.

The network transmits control signalling on control frames during each short time slot (t) of 0.25 ms. The control information is used on data transmission on time slot (t+1). A common control information within the control signalling can indicate if the time slot t+1 is to be used as an uplink or downlink. It is also possible to indicate which cellular devices are scheduled. In addition, an optional field can be configured in the common control information so that AP will explicitly indicate the grant number to be applied in next time slot using few extra bits. For example, three bits can be used for eight SPS grants.

Figure 5:
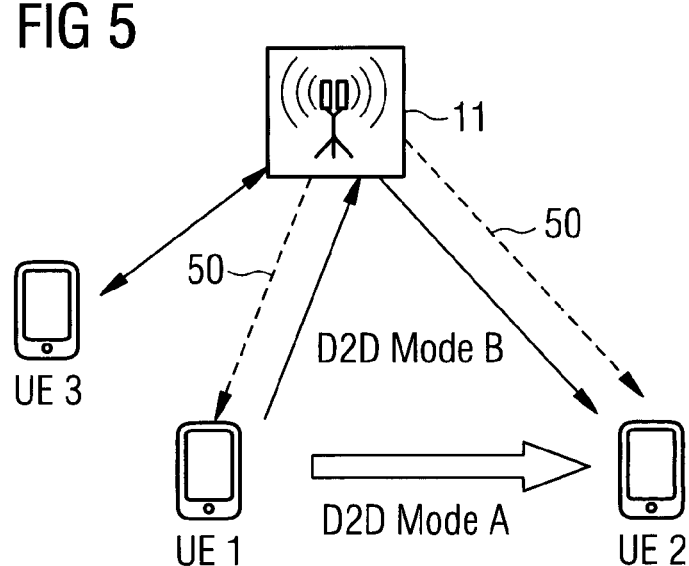
FIG. 5 shows an example of mode switching.

FIG. 5 shows an example of D2D devices UE 1, UE 2 and a cellular device 3 within service area of a network node 11, e.g. an AP. The cellular device and D2D devices may be in proximity in a manner that impacts the resource allocation for D2D communications for the case of cellular uplink or downlink slots. The cellular device UE 3 as well as the two D2D devices UE 1, UE 2 each can monitor common network downlink control information denote by dashed line 50. In the following example of fast mode selection is given in this scenario.

Initially the D2D device communicate in Mode A. In the example the network can switch UE 3 flexibly between UL and DL on time slots. The control signalling 50 comprises semi-persistent scheduling (SPS) for the D2D devices. The signalling can be for example a part of a newly designed Physical Downlink Control Channel (PDCCH). At the same time, the D2D devices also monitor whether their own semi-persistent cellular RNTIs are present in the control signalling in each time slot. When the signalling indicates the semi-persistent cellular RNTI of the D2D device as a scheduled device in the control information of time slot t, the D2D device can be configured to select in time slot t+1 mode B and use the associated grant, e.g. Grant 3. The semi-persistent cellular RNTI may comprise a new semi-persistent cellular RNTI for routing D2D traffic. More generally, any appropriate RNTI can be used to indicate a selected route.

If the cellular RNTI ID of the D2D device is not used, the D2D transmitting device can flexibly choose either Grant 1 or Grant 2 based on the monitored common control information using semi-persistent D2D device RNTI which had indicated whether the next slot will be an uplink slot or a downlink slot.

The selected mode and the grant index can be made available for the D2D receiving device as a part of the scheduling grant information. The control signalling from the network can also be provided to the D2D receiving device.

D2D devices may initiate an interrupt to the semi-static scheduling based on channel quality or interference measurement. The interrupt can also be initiated by the network, e.g. by the AP using the control signalling and issuing a new scheduling grant using D2D RNTI or cellular RNTI. The new grant then overrides the semi-static scheduling grants. The new scheduling grant can be either applied on top of the semi-persistent grant or by cancelling the existing semi-persistent grant. Cancellation of semi-persistent grant can be signalled using the semi-persistent cellular RNTI and the semi-persistent D2D RNTI.

The following example relates to a case when D2D slots are configured in UL/DL ratio 5:1 between two D2D devices. The time slots can be flexibly switched to uplink or downlink on a time slot basis for cellular users. From the two D2D devices device 1 is transmitting for majority of the time. Assume that the D2D capable device 1 has better channel conditions to the access point 11 but nevertheless a cellular device UE 3 should also be served by the access point 11. To resolve this scheduling dilemma, the access point 11 issues four scheduling grants to the D2D devices 1 and 2. Thus whenever device UE 3 transmits to the access point in uplink, D2D device 1 cannot transmit to the access point 11 on those same resources. In that case, D2D device 1 exploits the direct D2D option and transmits to D2D device UE 2 by re-using the resources which are currently used by device UE 3.

FIG. 6 Illustrates semi-persistent transmission with fast mode selection by a D2D device. The table shows an example of fast flexible uplink/downlink switching of an AP and an example of corresponding adaptation of D2D device 1 (DUE1). D2D device 2 (DUE2) transmits only on time slot T5 based on a semi-static configuration. The resource blocks (RBS) are indexed 1 to 20. The semi-persistent D2D scheduling can be enabled by the network for a longer duration, e.g. 20 time slots (5 ms).

FIG. 7 shows the signalling flow for this example of semi-persistent transmission with fast mode selection by a D2D device. More particularly, fast flexible uplink/downlink switching of AP and an example of corresponding adaptation of DUE1 is shown. DUE2 transmits only on time slot T5 based on a semi-static configuration.

The required data processing apparatus and functions of a network elements such as base station apparatus and other controller elements, a communication device, a core network element and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

D2D communications has several use cases which might benefit from semi-persistent scheduling (SPS). For example, low latency may be provided. Devices which need to communicate at a smaller time scale, such as vehicular communication, can benefit from pre-allocation of resources in the form herein suggested of SPS. Signalling overhead may also be reduced. In a scenario with a large number of D2D devices transferring smaller amounts of data in periodic bursts ((e.g. machine-to-machine (M2M), Car2Car, Gaming)), the added signalling cycle involving scheduling request (SR) and scheduling grants (SG) at TTI level from the network may be avoided, this increasing gain achieved from direct D2D communications. The reduction in SR by D2D users can be beneficial for reduced power consumption at D2D devices. The network can additionally issue SPS grants for cellular communication of D2D users, these being separate to D2D specific grants. The proposed arrangement can work seamlessly also in situations where network allocates SPS grants for cellular devices but does not communicate this information to D2D devices. The principles may also be applied to semi-static dynamic TDD configuration of cellular links, e.g. as in current 3GPP LTE assumptions.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method, comprising:
determining at a network node at least two semi-static resource allocations for device-to-device communication between devices;
communicating information about the at least two resource allocations to at least one of the devices for device-to-device communication, wherein the at least two resource allocations comprise at least one of
a resource allocation for direct communication between the devices to be used on downlink slots and
a resource allocation for direct communication between the devices to be used on uplink slots, and
at least one of
a resource allocation for device-to-device transmissions via the network on downlink slots, and
a resource allocation for device-to-device transmissions via the network on uplink slots; and
communicating control information to the at least one of the devices to enable the at least one of the devices to choose between the resource allocation for direct communication between the devices and the resource allocation for device-to-device transmissions via the network.

2. A method according to claim 1, wherein communicating of information about the at least two resource allocations to at least one of the devices is via high layer signalling or a physical layer downlink control channel.

3. A method according to claim 1, wherein the communication of control information is dynamic and/or per a communication time interval.

4. A method, comprising:
receiving at a device from a network node information about at least two semi-static resource allocations for device-to-device communication;
communicating with another device capable of device-to-device communication using one of the at least two resource allocations, wherein the at least two resource allocations comprise at least one of
a resource allocation for direct communication between the devices to be used on downlink slots, and
a resource allocation for direct communication between the devices to be used on uplink slots, and
at least one of
a resource allocation for device-to-device transmissions via the network on downlink slots, and
a resource allocation for device-to-device transmissions via the network on uplink slots; and
receiving control information at the device from the network node, to enable the device to choose between the resource allocation for direct communication between the device and another device and the resource allocation for device-to-device transmissions via the network.

5. A method according to claim 4, wherein receiving at the device from the network node information about at least two semi-static resource allocations for device-to-device communication is via high layer signalling or a physical layer downlink control channel.

6. A method according to claim 4, comprising selecting one of:

a resource allocation for direct communication between the devices in the absence of an indication to use the resource allocation for communication between the devices via the network;
a resource allocation for communication via the network when the control information indicates that the device is to communicate via the network; and
a resource allocation for direct communication between devices capable of device-to-device communications when control information indicates that a relevant further device is scheduled to communicate via the network.

7. A method according to claim 6, wherein the further device comprises a cellular device and the further device uses at least in part the same resources as the devices capable of device-to-device communication.

8. A method according to claim 4, wherein, when a resource allocation for communication between the devices capable of device-to-device communication via the network is selected by at least one of the devices, the method comprises using different resources by the at least one device and a relevant further device within the resource allocation in response to an indication that the further device is also to communicate via the network.

9. A method according to claim 4, comprising selecting by at least one of the devices one of the at least two resource allocations in dependence on control information indicating whether a communication time interval is uplink or downlink.

10. An apparatus, comprising:
at least one processor; and
at least one memory including computer program code, wherein the computer program code, when executed by the apparatus, causes the apparatus to
receive from a network node information about at least two semi-static resource allocations for device-to-device communication;
communicate with another device capable of device-to-device communication using one of the at least two resource allocations, wherein the at least two resource allocations comprise at least one of
a resource allocation for direct communication between the devices to be used on downlink slots, and
a resource allocation for direct communication between the devices to be used on uplink slots,
and at least one of
a resource allocation for device-to-device transmissions via the network on downlink slots, and
a resource allocation for device-to-device transmissions via the network on uplink slots; and
receiving control information from the network node, to enable the apparatus to choose between the resource allocation for direct communication between the apparatus and another device and the resource allocation for device-to-device transmissions via the network.

11. An apparatus according to claim 10, wherein receiving at the device from the network node information about at least two semi-static resource allocations for device-to-device communication is via high layer signalling or a physical layer downlink control channel.

12. An apparatus according to claim 10, wherein the computer program code, when executed by the apparatus, causes the apparatus to select one of:
a resource allocation for direct communication between the devices in the absence of an indication to use the resource allocation for communication between the devices via the network;

a resource allocation for communication via the network when the control information indicates that the device is to communicate via the network; and a resource allocation for direct communication between devices capable of device-to-device communications when control information indicates that a relevant further device is scheduled to communicate via the network.

13. An apparatus according to claim 12, wherein the further device comprises a cellular device and the further device uses at least in part the same resources as the devices capable of device-to-device communication.

14. An apparatus according to claim 10, wherein, when a resource allocation for communication between the devices capable of device-to-device communication via the network is selected by the apparatus, the computer program code, when executed by the apparatus, causes the apparatus to use different resources by the apparatus and a relevant further device within the resource allocation in response to an indication that the further device is also to communicate via the network.

15. An apparatus according to claim 10, wherein the the computer program code, when executed by the apparatus, causes the apparatus to select one of the at least two resource allocations in dependence on control information indicating whether a communication time interval is uplink or downlink.

* * * * *